United States Patent
Trescases et al.

(10) Patent No.: US 7,969,694 B2
(45) Date of Patent: Jun. 28, 2011

(54) DIODE LOSS DETECTION FOR LOW SIDE MOSFET OF A SYNCHRONOUS OUTPUT STAGE

(75) Inventors: Olivier Trescases, Villach (AT); Derek Bernardon, Villach (AT)

(73) Assignee: Infineon Technologies AG, Neubiberg (DE)

( * ) Notice: Subject to any disclaimer, the term of this patent is extended or adjusted under 35 U.S.C. 154(b) by 351 days.

(21) Appl. No.: 12/191,040

(22) Filed: Aug. 13, 2008

(65) Prior Publication Data
US 2010/0039735 A1    Feb. 18, 2010

(51) Int. Cl.
*H02H 7/00*    (2006.01)
(52) U.S. Cl. ....... 361/18; 361/91.1; 361/91.2; 361/91.3; 361/91.5; 361/101; 363/53; 363/50
(58) Field of Classification Search .................... 361/18, 361/91.1, 91.2, 91.3, 91.5, 101; 363/53, 363/52, 50, 23, 21.12
See application file for complete search history.

(56) References Cited

U.S. PATENT DOCUMENTS

| | | | |
|---|---|---|---|
| 5,088,018 A * | 2/1992 | Lee ........................... | 363/56.01 |
| 6,191,964 B1 * | 2/2001 | Boylan et al. ................ | 363/89 |
| 6,671,193 B1 * | 12/2003 | Pelkonen ...................... | 363/53 |
| 6,674,657 B2 * | 1/2004 | Nagaya et al. ................ | 363/50 |
| 6,778,412 B2 * | 8/2004 | Nagai et al. .................. | 363/53 |
| 2003/0026115 A1 * | 2/2003 | Miyazaki ..................... | 363/53 |
| 2005/0036342 A1 * | 2/2005 | Uchida ........................ | 363/53 |
| 2008/0013236 A1 * | 1/2008 | Weng .......................... | 361/91.1 |

\* cited by examiner

*Primary Examiner* — Patrick Salce
(74) *Attorney, Agent, or Firm* — Slater & Matsil, L.L.P.

(57) ABSTRACT

An embodiment of the invention relates to a switch-mode power converter including an inductor and an external rectifying diode. A series arrangement of a resistor and a switch are coupled in parallel with the external rectifying diode. The resistor and the switch enable continuous conduction mode, even at substantially no output current. A comparator senses a current level in the resistor. When the current level crosses a threshold level, the power converter is shut down. The current level is sensed with a second resistor coupled to a current source to produce a current sensing arrangement dependent on a ratio of resistances. Advantageously, the current level is sensed with clamp circuits coupled to the comparator, each clamp circuit including a series circuit arrangement of a field-effect transistor with a gate coupled to a voltage source.

25 Claims, 2 Drawing Sheets

DIODE LOSS DETECTION FOR LOW SIDE MOSFET OF A SYNCHRONOUS OUTPUT STAGE

TECHNICAL FIELD

An embodiment of the invention relates generally to electronic power conversion and methods, and more particularly to protecting a power converter against a circuit failure.

BACKGROUND

A switch-mode power converter (also referred to as a "power converter" or "regulator") is a power supply or power processing circuit that converts an input voltage waveform into a specified output voltage waveform. DC-DC power converters convert a dc input voltage into a dc output voltage. Controllers associated with the power converters manage an operation thereof by controlling the conduction periods of switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of the switches of the power converter. The duty cycle is a ratio represented by a conduction period of a switch to a switching period thereof. Thus, if a switch conducts for half of the switching period, the duty cycle for the switch would be 0.5 (or 50%). Additionally, as voltage or current for systems, such as a microprocessor powered by the power converter, dynamically change (e.g., as a computational load on a load microprocessor changes), the controller should be configured to dynamically increase or decrease the duty cycle of the switches therein to maintain an output characteristic such as an output voltage at a desired value.

In an exemplary application, the power converters have the capability to convert an unregulated input voltage, such as 12 volts, supplied by an input voltage source to a lower, regulated, output voltage, such as 2.5 volts, to power a load. To provide the voltage conversion and regulation functions, the power converters include active power switches such as metal-oxide semiconductor field-effect transistors ("MOSFETs") that are coupled to the voltage source and periodically switch a reactive circuit element such as an inductor to the voltage source at a switching frequency that may be on the order of 500 kHz or higher.

A conventional way to construct a power converter is to integrate several key semiconductor devices such as control circuit elements and an active semiconductor switch in an integrated circuit, and to couple the integrated circuit to separate components that are not easily integrated. Separate components that are not easily integrated, such as a power diode, typically dissipate a substantial level of power, or are formed of materials and structures that are not easily integrated in a semiconductor device, such as an output filter inductor or an output filter capacitor. Integrating a low-side power switch increases the size of the integrated circuit and increases the risk of latch up. Using a diode separate from the integrated circuit is a safer alternative in some designs.

In certain applications wherein a power diode is externally coupled to an integrated circuit, it is important to detect a diode open-circuit condition, caused either by a failed connection or a failed diode, and if the diode circuit is open, to power down the power converter. Failure to power down the power converter in such a circumstance can result in dangerously high pulsed voltages across terminals coupled to the diode when current flowing through the output filter inductor reverses direction, for example, during a low-load condition. Thus, in an application of a power converter such as in an automotive environment wherein a diode is separately coupled to an integrated circuit, if the diode is disconnected for any reason, this condition must be detected and the power converter shut down.

Switch-mode power converters are often constructed with active switches such as field-effect transistors to perform an output rectification function. In such arrangements, the switches are alternately controlled so that at least one switch is enabled to conduct at any time during a switching cycle (with suitable accommodation to prevent switch conduction overlap during the switching transitions). Such an arrangement is usually referred to as a "synchronous output stage," and the process is referred to as "synchronous rectification" due to synchronization of conduction periods of the active output rectifying switches with conduction periods of switches on the primary side of a power converter when an isolation transformer is employed to metallically isolate the output terminals of the power converter from the input terminals.

A synchronous output stage generally allows simplification of the design of the controller if the power conversion mode of operation is limited to continuous conduction mode ("CCM"). CCM allows reversed current flow in the output inductor with a minimum load current of zero, even at maximum input voltage.

Thus, there is a need for a process and related method to detect an open-circuit condition for a rectifying diode separated from an integrated circuit in a switch-mode power converter. The detection process would shut down the power converter when such an open-circuit condition is detected, thereby providing safe operation for the power converter while admitting the economy and other advantages of separating an output rectifying diode from an integrated circuit.

SUMMARY OF THE INVENTION

In accordance with an exemplary embodiment, a process of protecting a power-processing device such as a switch-mode power converter that includes a diode coupled in series with an inductor and a related method are provided. A series arrangement of a resistor and a switch is coupled in parallel with the diode. The resistance of the resistor is preferably selected to be of the same order of magnitude as the on-resistance of the switch. In an embodiment, a first input terminal of a comparator is coupled to a first terminal of the resistor and a second input terminal of the comparator is coupled to a second terminal of the resistor. The comparator is configured to assert an output signal when a current through the resistor crosses a threshold current level, and a controller is configured to shut down the power-processing device in response to assertion of the output signal. In an embodiment, the switch is configured to carry a small fraction of the current carried by the diode when the diode is substantially forward biased. In an embodiment, the switch comprises an area of a semiconductor die less than 50% of the area of another switch formed on the semiconductor die. In an embodiment, the series arrangement of the resistor and the switch enable the power-processing device to operate in continuous conduction mode at substantially no load current. In an embodiment, the power-processing device is a switch-mode power converter.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will not be redescribed in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a switch-mode power converter including an integrated circuit that provides a switching and control function, and a power diode coupled to and separated from the integrated circuit. The integrated circuit includes a process to detect an open-circuit condition in the portion of the circuit that includes the power diode.

An embodiment of the invention may be applied to various electronic power conversion devices, for example, to a power converter to produce a regulated output voltage from an unregulated input voltage. Other electronic power conversion devices can be constructed using a diode open-circuit detection process as introduced herein in different contexts using inventive concepts described herein, for example, a power amplifier or a motor controller applied in a communications or an industrial environment.

Figure 1:
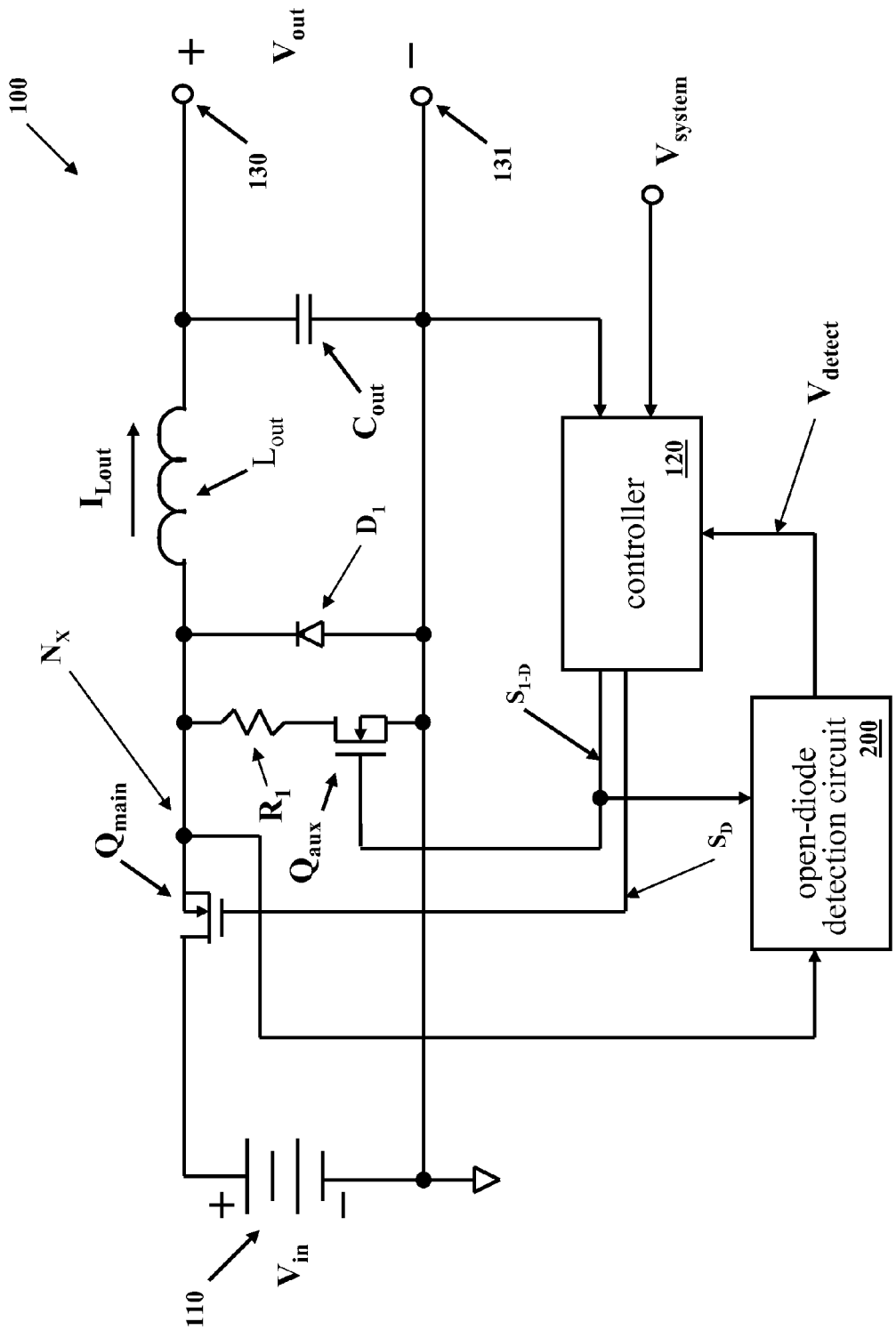
FIG. 1 illustrates a schematic diagram of an embodiment of a power train of a power converter coupled to a controller, constructed according to an exemplary embodiment.

Referring initially to FIG. 1, illustrated is a simplified schematic diagram of a power train 100 of a switch-mode power converter to illustrate the operation thereof. The power converter includes a controller 120 that regulates a power converter output characteristic such as an output voltage. The power converter provides power to a system/load (not shown) coupled to output terminals 130 and 131. While the illustrated power train employs a buck converter topology, those skilled in the art should understand that other converter topologies are well within the broad scope of the present invention.

The power train of the power converter receives an input voltage $V_{in}$ from a source of electrical power (represented by battery 110) at an input thereof and provides a regulated output voltage $V_{out}$ or other output characteristic at output terminals 130 and 131. In keeping with the principles of a buck converter topology, the output voltage $V_{out}$ is generally less than the input voltage $V_{in}$ such that a switching operation of the power converter can regulate the output voltage $V_{out}$.

During a first portion D of a high-frequency switching cycle, the power switch $Q_{main}$ is enabled to conduct in response to a gate drive signal $S_D$ for a primary interval, coupling the input voltage $V_{in}$ to an output filter inductor $L_{out}$. During the first portion D of the high-frequency switching cycle, an inductor current $I_{Lout}$ flowing through the output filter inductor $L_{out}$ increases as current flows from the input to the output of the power train. An ac component of the inductor current $I_{Lout}$ is filtered by the output capacitor $C_{out}$.

During a second portion 1-D of the switching cycle, the power switch $Q_{main}$ is transitioned to a non-conducting state, and an auxiliary power switch $Q_{aux}$ (e.g., an n-channel MOSFET), coupled to the output filter inductor $L_{out}$, is enabled to conduct in response to a gate drive signal $S_{1-D}$. The auxiliary power switch $Q_{aux}$ provides a current path to maintain continuity of inductor current $I_{Lout}$ flowing through the output filter inductor $L_{out}$. Diode $D_1$ is coupled in parallel with auxiliary power switch $Q_{aux}$ to provide a principal current path to maintain continuity of the inductor current $I_{Lout}$. Resistor $R_1$ is coupled in series with auxiliary power switch $Q_{aux}$ to limit current flowing therethrough as described further hereinbelow. During the second portion 1-D of the switching cycle, the inductor current $I_{Lout}$ flowing through the output filter inductor $L_{out}$ decreases. In general, the duty cycle of the power switch $Q_{main}$ and the auxiliary power switch $Q_{aux}$ may be adjusted to regulate the output voltage $V_{out}$ of the power converter. Those skilled in the art should understand, however, that the conduction periods for the two power switches may be separated by a small time interval to avoid cross conduction therebetween, and beneficially to reduce the switching losses associated with the power converter.

The controller 120 of the power converter receives the output voltage $V_{out}$ of the power converter and a desired output characteristic such as a desired system voltage $V_{system}$.

In a switch-mode power converter, such as the buck power converter illustrated and described with reference to FIG. 1, the duty cycle D of the power switch $Q_{main}$ determines the steady-state ratio of a power converter output voltage $V_{out}$ to its input voltage $V_{in}$. In particular, for a buck power converter typology operating in CCM, the duty cycle determines the ratio of output voltage to input voltage (ignoring certain losses within the power converter) according to the equation:

$$D=V_{out}/V_{in}.$$

In an alternative power converter typology, such as a boost topology, the duty cycle may determine the ratio of output voltage to input voltage according to another equation.

The controller 120 is coupled to an open-diode detection circuit 200 that provides a signal $V_{detect}$ to shut down the power train if an open-diode circuit is detected, i.e., diode $D_1$, as described later hereinbelow. The open-diode detection circuit 200 advantageously senses a current in the switch $Q_{aux}$ with a threshold that is substantially independent of temperature and semiconductor process variation.

The combination of the two series-coupled power switches $Q_{main}$ and $Q_{aux}$ are generally referred to as a synchronous rectifier output stage.

It has been common practice to use a rectifying output stage with a diode separate from an integrated circuit to avoid substrate current flow during the dead time where neither of two power switches is conducting. In applications where this was done, detection of loss or failure of the separate diode was not employed.

Figure 2:
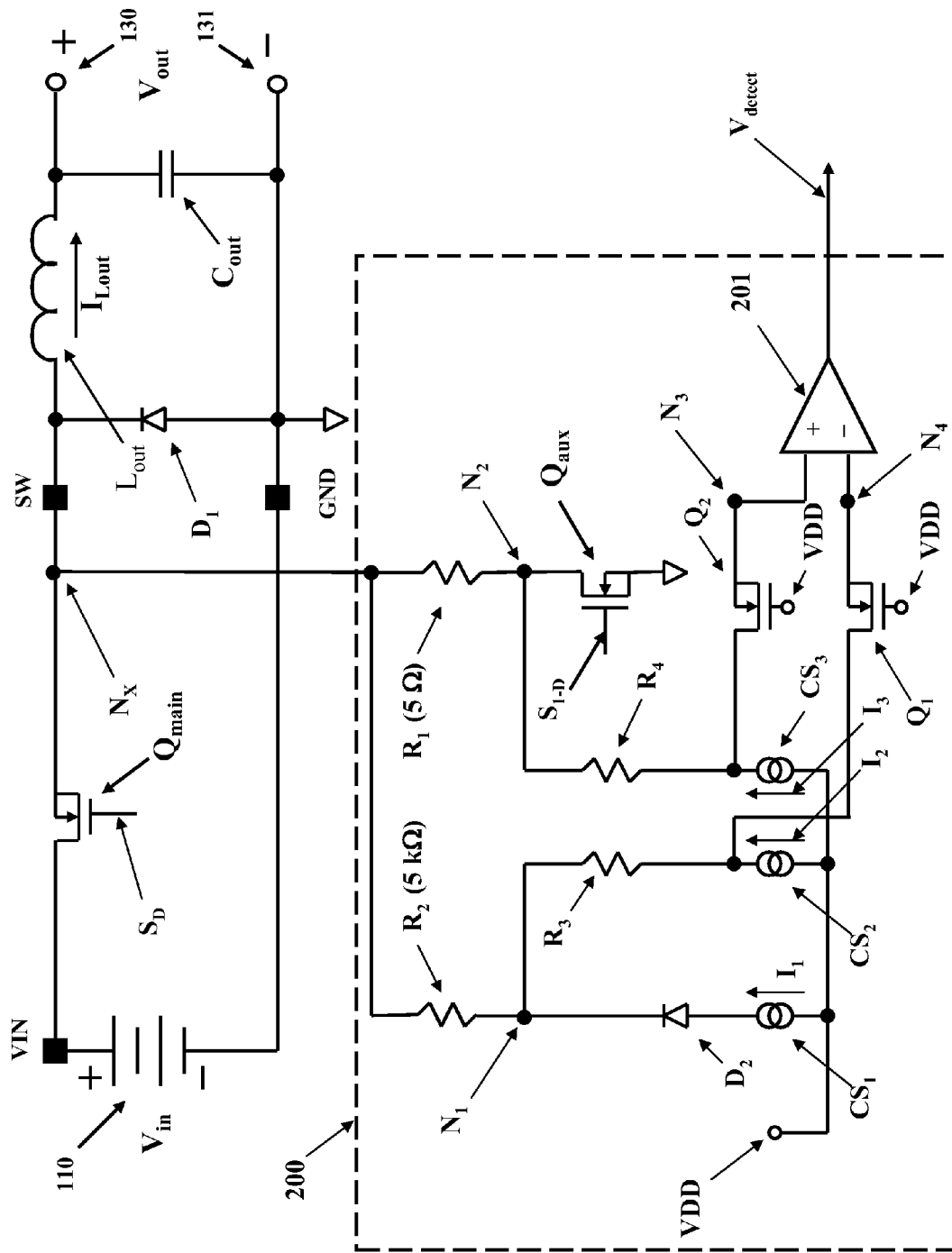
FIG. 2 illustrates a schematic diagram of an embodiment of a power train of a power converter including an open-diode detection circuit, constructed according to an exemplary embodiment.

Turning now to FIG. 2, illustrated is a simplified schematic diagram of a power train of a switch-mode power converter constructed with a separately connected diode $D_1$ and an open-diode detection circuit 200. The open-diode detection circuit provides a current-based threshold to detect the absence or failure of the diode $D_1$. The open-diode detection circuit is insensitive to silicon process and temperature variations in comparison to an approach that would operate on a voltage-based threshold. The open-diode detection circuit includes comparator 201 configured to signal an open circuit in the portion of the power train that includes the diode $D_1$. The schematic is shown with pins VIN, SW, and GND to accommodate the separately connected diode $D_1$ and a connection to the input power source $V_{in}$. The converter power train is controlled by a controller (not shown) in a manner similar to that performed by the controller 120 illustrated and described with reference to FIG. 1.

The open-diode detection circuit includes the power switch $Q_{aux}$ coupled in series with resistor $R_1$ that is switched by the signal $S_{1-D}$ to enable conduction of the switch $Q_{aux}$ that is substantially out of phase with respect to conduction of the main power switch $Q_{main}$. Thus, during ordinary circuit operation when the diode $D_1$ conducts, the switch $Q_{aux}$ carries a small portion, for example 10%, of the current ordinarily carried by diode $D_1$ during the 1-D part of a switching cycle due to inclusion of the series resistor $R_1$ that is coupled to the pin SW. The resistance of resistor $R_1$ is selected to be of the same order of magnitude as the on-resistance of power switch $Q_{aux}$, which is not an ordinary design choice for a power supply. An exemplary value of the resistance of resistor $R_1$ is 5Ω as illustrated in FIG. 2. During normal circuit operation when the diode $D_1$ is functional in the circuit, when the current $I_{Lout}$ in inductor $L_{out}$ is positive (i.e., flowing toward the circuit node 130), the current $I_{Lout}$ is shared between the diode $D_1$ and the switch $Q_3$. The resistance of resistor $R_1$ is chosen to set this ratio on the order of, for example, 1:10, i.e., most of the current is carried by the diode resulting in little power dissipation in the switch $Q_{aux}$. Since the power switch $Q_{aux}$ carries only a small portion of the current that flows through the output inductor $L_{out}$, its area can be relatively small compared to the area of power switch $Q_{main}$ in an integrated circuit because it advantageously dissipates a relatively low level of power compared to that of $Q_{main}$.

A second resistor $R_2$ is also coupled to the pin SW.

The power switch $Q_{aux}$ carries substantially all of the current when the current $I_{Lout}$ in inductor $L_{out}$ is negative at light load current because the diode $D_1$ conducts essentially no reverse current at this time. Note that the signal $S_{1-D}$ enables the power switch $Q_{aux}$ to conduct when the power switch $Q_{main}$ is disabled to conduct. This forces the power converter to operate in CCM even at light load currents, which simplifies compensation of the control loop. If the power converter can operate either in CCM or discontinuous current mode ("DCM"), precautions and compromises must be made in the design of the control loop to accommodate these two modes of operation.

If the diode $D_1$ does not conduct, then the voltage at node $N_1$ will be substantially negative during the 1-D portion of the power converter duty cycle. If the diode is disconnected, then substantially all of the current of the output filter inductor $L_{out}$ flows in the switch $Q_{aux}$ and in its series-connected resistor $R_1$. The open-diode detection circuit detects the condition when a current in the switch $Q_{aux}$ has exceeded a current threshold to assert the signal $V_{detect}$, indicating that the diode $D_1$ is damaged or has been disconnected. The open-diode detection circuit includes current sources $CS_1$, $CS_2$ and $CS_3$, respectively producing currents $I_1$, $I_2$, and $I_3$. The circuit is configured so that the current $I_2$ equals the current $I_3$, which can be readily accomplished using current mirrors, using design techniques well known in the art. In addition, the resistances of resistors $R_3$ and $R_4$ are equal. Thus, the voltage drops across resistors $R_3$ and $R_4$ are equal. Nodes $N_3$ and $N_4$ are the inputs to comparator 201. The voltage at node $N_3$ is at the same voltage as node $N_4$ when the current in $Q_{aux}$ is equal to the current threshold $R_2/R_1 \cdot (I_1+I_2)$. The ratio of the resistance of resistor $R_2$ to the resistance of resistor $R_1$ is set to, for example, 1000:1. The ratio of resistances in a semiconductor device can be readily maintained independent of process and device temperature, even if their absolute values may substantially vary. If the current in $Q_{aux}$ is greater than the current threshold $R_2/R_1 \cdot (I_1+I_2)$, then the signal $V_{detect}$ is asserted, indicating that the diode $D_1$ is damaged or has been disconnected. Thus, when the voltage at the node $N_X$, which exhibits a substantial negative value when the diode $D_1$ is disconnected, it can be accurately sensed by shifting voltages with the resistors $R_3$ and $R_4$. The voltage shifts by these resistors are $R_3 \cdot I_2$ and $R_4 \cdot I_3$, which are equal. The currents $I_2$ and $I_3$ and the resistor $R_3$ are chosen so that the voltages at the input nodes $N_3$ and $N_4$ of comparator 201 are not below local circuit ground.

Comparator 201 would ordinarily be formed with a low-voltage semiconductor process. Accordingly, its input terminals should be protected against high voltages, such as exposure to the input voltage $V_{in}$ when the switch $Q_{main}$ is enabled to conduct by the signal $S_D$. The switches $Q_1$ and $Q_2$ are "on" in normal operation, with their gates connected to the positive bias voltage VDD. When the node $N_X$ exhibits a substantial positive voltage above the gate voltage of the switches $Q_1$ and $Q_2$, the switches $Q_1$ and $Q_2$ are "off," and the nodes $N_3$ and $N_4$ are clamped by the bias voltage VDD applied to the gates of switches $Q_1$ and $Q_2$ (with a small voltage correction for their gate-to-source threshold voltages).

The temperature-insensitive threshold current level $R_2/R_1 \cdot (I_1+I_2)$ is set sufficiently high by choice of the current $I_1$ so that it is not exceeded in normal circuit operation, i.e., when the diode $D_1$ is present, even for maximum forward current flowing through diode $D_1$ properly connected. Under such normal circuit operation, the minimum voltage at the node $N_X$ is about −0.7 V. The maximum current through the resistor $R_1$ during normal circuit operation is limited to about $0.7/(R_1+R_{ds\_on})$, where $R_{ds\_on}$ on is the on-resistance of the switch $Q_{aux}$.

Thus, the open-diode detection circuit operates by detecting a current through the resistor $R_1$, which also flows through the switch $Q_{aux}$. The current threshold level is dependent on a ratio of resistors, which can be produced in a semiconductor device to be substantially substantial temperature and process independent. The alternative of detection of a voltage would be sensitive to temperature and semiconductor process variations, and would not provide the accuracy and repeatability of detecting the current.

The signal $V_{detect}$ can be coupled to a controller, such as controller 120 illustrated in FIG. 1, to disable operation of the power converter when an open diode circuit is detected. A digital filter may be included to count a number of consecutive switching cycles where the comparator triggers before turning "off" the converter in order to make the process more robust to noise, and hence improve immunity to false detection of a diode open circuit. For example, a sequence of eight consecutive switching cycles of open-circuit detections may be required before turning off the converter. In a further embodiment, the output of comparator 201 can be ignored during the first/D portion of the switching cycle.

An advantage of using a separate diode is that the majority of the current during the second/1-D portion of the switching cycle ordinarily flows through the diode, thereby limiting internal power dissipation in the integrated circuit. The separate diode thus provides protection against substrate current injection by limiting activation of the epitaxial substrate diode of the low-side MOSFET $Q_{aux}$. When the load current is low, this structure allows a reverse current to flow through the switch $Q_{aux}$, even when diode is present, permitting CCM under all operating conditions. The process, however, allows low load currents to flow, even if the diode $D_1$ is disconnected, which is important because it can allow a small load such as a microcontroller to run for a short period of time if it does not draw too much current. When the current exceeds a certain level, then the diode loss-detection circuit operates and shuts down the power converter.

Thus, an output stage including a separately mounted diode is constructed with protection against an open diode circuit, allowing CCM operation at low-load or no-load conditions where the separately mounted diode carries the major portion of the current for high load currents. The inclusion of a resistor (such as resistor $R_1$) in series with a small MOSFET switch reduces the die area required to obtain CCM operation under all operating conditions, permitting a relatively accurate current measurement to determine the triggering level to turn off the power converter if the separate diode is disconnected. Only marginal substrate current is produced, which is tolerable during the dead time of the power switches.

The concept has thus been introduced of protecting a power-processing device that includes a diode coupled in series with the inductor. In an embodiment, a series arrangement of a first resistor and a switch is coupled in parallel with the diode. The resistance of the first resistor is preferably selected to be of the same order of magnitude as the on-resistance of the switch. In an embodiment, a first input terminal of a comparator is coupled to a first terminal of the first resistor and a second input terminal of the comparator is coupled to a second terminal of the first resistor. The comparator is configured to assert an output signal when a current through the first resistor crosses a threshold current level. A controller is configured to shut down the power-processing device in response to assertion of the output signal. In a further embodiment, the controller shuts down the power-processing device after a number of assertions of the output signal over consecutive switching cycles of the power-processing device. In an embodiment, a first current source provides a current through a second resistor and a second current source provides a current through a third resistor. The second resistor is coupled to the first input terminal of the comparator, and the third resistor is coupled to the second input terminal of the comparator. The level of voltages of the first terminal and the second terminal of the first resistor is thereby shifted at the input terminals of the comparator to avoid the need to handle large negative voltages at the comparator input terminals.

In an embodiment, the first current source and the second current source are configured to produce substantially equal currents, and the second resistor and the third resistor have substantially equal resistances. In a further embodiment, a fourth resistor is coupled between the second terminal of the first resistor and the second input terminal of the comparator. In an embodiment, the switch carries a small fraction of the current carried by the diode when the diode is substantially forward biased. In an embodiment, the switch comprises an area of a semiconductor die preferably less than 50% of the area of another switch formed on the semiconductor die. In an embodiment, the series arrangement of the first resistor and the switch enable the power-processing device to operate in continuous conduction mode at substantially no load current. In a further embodiment, a first clamp circuit is coupled to the first input terminal of the comparator, and a second clamp circuit is coupled to the second input terminal of the comparator. In an embodiment, the first clamp circuit comprises a metal-oxide semiconductor field-effect transistor with a drain terminal coupled to a terminal of the first current source, a source terminal coupled to the first input terminal of the comparator, and a gate terminal coupled to a voltage source. In an embodiment, the power-processing device is a switch-mode power converter.

Another exemplary embodiment provides a method of protecting a power-processing device that includes a diode coupled in series with an inductor. In an embodiment, the method includes coupling a series arrangement of a first resistor and a switch in parallel with the diode. In an embodiment, the resistance of the first resistor is of the same order of magnitude as the on-resistance of the switch. The method further includes coupling a first input terminal of a comparator to a first terminal of the first resistor, and coupling a second input terminal of the comparator to a second terminal of the first resistor. The method further includes adding a bias signal at the second input terminal of the comparator to establish a threshold level, and shutting down the power-processing device in response to an output signal asserted by the comparator. In an embodiment, the method further includes counting assertions of the output signal over consecutive successive switching cycles of the power-processing device, and shutting down the power-processing device after a number of the consecutive output signal assertions. In an embodiment, the method further includes coupling a first current source to a second resistor, coupling a second current source to a third resistor, coupling the second resistor to the first input terminal of the comparator, and coupling the third resistor to the second input terminal of the comparator. The level of voltages of the first terminal and the second terminal of the first resistor are thereby respectively shifted at the input terminals of the comparator by the first and the second current sources and the second and the third resistors. In an embodiment, the first current source and the second current source produce substantially equal currents, and the second resistor and the third resistor have substantially equal resistances. In an embodiment, the method further includes coupling a fourth resistor between the second terminal of the first resistor and the second input terminal of the comparator. In an embodiment, the switch carries a small fraction of the current carried by the diode when the diode is substantially forward biased.

In an embodiment, the method further includes forming the switch with a semiconductor die area less than 50% of the area of another switch formed on the semiconductor die. In an embodiment, the series arrangement of the first resistor and the switch enable the power-processing device to operate in continuous conduction mode at substantially no load current. In an embodiment, the method further includes coupling a first clamp circuit to the first input terminal of the comparator, and coupling a second clamp circuit to the second input terminal of the comparator. In an embodiment, the first clamp circuit includes a metal-oxide semiconductor field-effect transistor with a drain terminal coupled to a terminal of the first current source, a source terminal coupled to the first input terminal of the comparator, and a gate terminal coupled to a voltage source. In an embodiment, the power-processing device is a switch-mode power-processing device.

Although a process to protect a power-processing device such as a power converter and related methods has been described for application to electronic power-processing devices, it should be understood that other applications of the process, such as motor controllers and power amplifiers, are contemplated within the broad scope of the invention, and need not be limited to electronic power-processing applications.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A power-processing device, comprising:
   a first system input configured to be coupled to a diode and an inductor of a power supply circuit;
   a first resistor comprising a first terminal coupled to a switch, and a second terminal coupled to the first system input, wherein the resistance of the first resistor is of a same order of magnitude as an on-resistance of the switch;
   a second resistor comprising a first terminal coupled to a first current source, and a second terminal coupled to the first system input; and
   a comparator with a first input terminal coupled to the first terminal of the first resistor and a second input terminal coupled to the first terminal of the second resistor, wherein the comparator asserts an output signal when a voltage difference between the first and second input terminals of the comparator crosses a threshold.

2. The power-processing device as claimed in claim 1, further including a controller to shut down the power-processing device in response to assertion of the output signal.

3. The power-processing device as claimed in claim 2, wherein the controller shuts down the power-processing device after a number of assertions of the output signal over consecutive switching cycles of the power-processing device.

4. The power-processing device as claimed in claim 1, further including a second current source providing a current through a third resistor, the third resistor coupled to the second input terminal of the comparator to shift voltage levels at the second input terminal of the comparator.

5. The power-processing device as claimed in claim 4, wherein the first current source and the second current source are configured to produce substantially equal currents and the second resistor and the third resistor have substantially equal resistances.

6. The power-processing device as claimed in claim 5, further including a fourth resistor coupled between the second terminal of the first resistor and the first input terminal of the comparator.

7. The power-processing device as claimed in claim 1, wherein the switch carries a small fraction of the current carried by the diode when the diode is substantially forward biased.

8. The power-processing device as claimed in claim 1, wherein the switch comprises an area of a semiconductor die less than 50% of an area of another switch formed on the semiconductor die.

9. The power-processing device as claimed in claim 1, wherein the series arrangement of the first resistor and the switch enable the power processing device to operate in continuous conduction mode at substantially no load current.

10. The power-processing device as claimed in claim 1, further including a first clamp circuit coupled to the first input terminal of the comparator, and a second clamp circuit coupled to the second input terminal of the comparator.

11. The power-processing device as claimed in claim 10, wherein the second clamp circuit comprises a metal-oxide semiconductor field-effect transistor with a drain terminal coupled to a terminal of the first current source, a source terminal coupled to the second input terminal of the comparator, and a gate terminal coupled to a voltage source.

12. The power-processing device as claimed in claim 1, wherein the power-processing device is a switch-mode power converter.

13. A method of protecting a power-processing device, the method comprising:
   coupling a diode in series with an inductor of the power-processing device;
   coupling a series arrangement of a first resistor and a switch in parallel with the diode,
   wherein the resistance of the first resistor is of a same order of magnitude as an on-resistance of the switch;
   coupling a first input terminal of a comparator to a first terminal of the first resistor;
   coupling a second input terminal of the comparator to a second terminal of the first resistor;
   adding a bias signal at the second input terminal of the comparator to establish a threshold level;
   shutting down the power processing device in response to an output signal asserted by the comparator;
   coupling a first current source to a second resistor;
   coupling a second current source to a third resistor;
   coupling the second resistor to the first input terminal of the comparator; and
   coupling the third resistor to the second input terminal of the comparator, wherein voltage levels of the first terminal and the second terminal of the first resistor are respectively shifted at the input terminals of the comparator by the first and the second current sources and the second and the third resistors.

14. The method as claimed in claim 13, further comprising:
   counting consecutive assertions of the output signal over successive switching cycles of the power-processing device; and
   shutting down the power-processing device after a number of consecutive assertions of the output signal.

15. The method as claimed in claim 13, wherein the first current source and the second current source produce substantially equal currents and the second resistor and the third resistor have substantially equal resistances.

16. The method as claimed in claim 13, further comprising coupling a fourth resistor between the second terminal of the first resistor and the second input terminal of the comparator.

17. A power-processing device comprising:
   a first input configured to be coupled to a diode and an inductor of a power supply circuit;
   a series arrangement of a first resistor and a switch coupled to the first input, wherein the resistance of the first resistor is of a same order of magnitude as an on-resistance of the switch;
   a comparator with a first input terminal coupled to a first terminal of the first resistor and a second input terminal coupled to a second terminal of the first resistor, wherein the comparator asserts an output signal when a current through the first resistor crosses a threshold current level;
   a first current source providing a current through a second resistor; and
   a second current source providing a current through a third resistor, the second resistor coupled to the first input terminal of the comparator and the third resistor coupled to the second input terminal of the comparator to shift respectively voltage levels of the first terminal of the first resistor and the second terminal of the first resistor.

18. The power-processing device as claimed in claim 17, wherein the first current source and the second current source are configured to produce substantially equal currents and the second resistor and the third resistor have substantially equal resistances.

19. The power-processing device as claimed in claim 18, further including a fourth resistor coupled between the second terminal of the first resistor and the second input terminal of the comparator.

20. A method of operating a power supply circuit comprising a switch configured to be coupled to a diode and an inductor of a power supply system, the method comprising:
  monitoring a first voltage at a first end of a first resistor, wherein the first end of the first resistor is coupled to the switch and a second end of the first resistor is coupled to the diode and the inductor;
  monitoring a second voltage at a first end of a second resistor, wherein the first end of the second resistor is coupled to a reference current source and a second end of the second resistor is coupled to the second end of the first resistor;
  comparing the first voltage with the second voltage;
  detecting a failure of the diode based on the comparing, detecting comprising determining that the diode has failed if a difference between the first voltage and the second voltage crosses a threshold; and
  shutting down the power supply system if the failure of the diode is determined.

21. The method of claim 20, further comprising asserting a failure signal if a failure is detected.

22. The method of claim 21, further comprising counting consecutive assertions of the failure signal over successive switching cycles of the power supply system, wherein shutting down the power supply system comprises shutting down the power supply system after a number of consecutive assertions of the failure signal.

23. The method of claim 20, further comprising operating the power supply system in a continuous conduction mode at substantially no load current.

24. The method of claim 20, wherein comparing the first voltage with the second voltage comprises using a comparator having a first input coupled to the first end of the first resistor and a second input coupled to the second end of the first resistor.

25. The method as claimed in claim 20, further comprising operating the power supply system, the power supply system comprising a switched-mode power supply system.

* * * * *